Reissued July 6, 1937

Re. 20,438

UNITED STATES PATENT OFFICE 20,438

ARTICLE OF MANUFACTURE AND PROCESS OF MAKING THE SAME

Waldo G. Morse, deceased, late of Yonkers, N. Y., by Ulmont O. Cumming, assignee, New York, N. Y.

No Drawing. Original No. 1,568,463, dated January 5, 1926, Serial No. 705,521, April 10, 1924. Application for reissue December 4, 1936, Serial No. 114,284

11 Claims. (Cl. 18—57)

The invention relates to an article of manufacture useful and for use in the transfusion of light and its dissemination and process of making the same, and has for its objects the rendering visible of images represented by varying intensities in projected rays of light, and the production of visible images in such manner upon either side or both sides of sheets of material, screens or films as hereinafter set forth.

A further object is to produce such article of manufacture of a flexible type, but with sufficient rigidity so that the same may be stretched or hung as a screen or curtain, or may be rolled up in whole or in part as desired.

With these and other objects in view, the invention consists in the novel combination of ingredients or substances and the resulting article produced thereby to be more fully set forth hereinafter and described in this specification.

It is apparent that the scope of the purposes of the invention as hereinafter set forth is such that the results described may be accomplished and carried out in various ways and by the employment of different materials without in any wise departing from the spirit of said invention.

In carrying out the invention, there has been employed and preferably used a combination of oxidizing oil, such as linseed oil with a lighter oil, such as turpentine, and a white or other dryer, together forming a fluid or vehicle so-called, to be used as a constituent part of a coating to be employed as hereinafter set forth.

With and into said vehicle is incorporated a pigment so-called in the art, consisting of finely powdered magnesium carbonate or the common magnesia as known to pharmacists, said pigment being incorporated with said vehicle preferably through the making of a paste or thick cream through the mechanical mixture of the turpentine or other light oil with the magnesia and the subsequent addition of the other oils, or in any manner well known and which would be understood by those familiar with the art.

A piece of cloth, film or other material suitable for a support, translucent or capable of becoming translucent when oiled or subjected to the influence of other material having an effect similar to that of oil, is stretched upon a frame or otherwise conveniently held and upon the surface or surfaces of the same is spread the composition above described, penetrating its substance as much as may be, whereupon the entire structure is allowed to stand until the composition shall have been solidified under the drying or oxiding influences of the atmosphere or shall have been dried or solidified by other means.

The quantities and amounts of pigment and vehicle above set forth and the proportions of the same may be varied as required for the purpose of securing the density necessary in obtaining varying results in view and effects desired, as hereinafter set forth, and coats of the said material may be given to one or both sides of a cloth or other support and additional coats may be given, on one or both sides of the same, as may be wished.

In practice, it has been found that a mixture of said pigment and vehicle which shall have the consistency of a very thin oil paint is most desirable for certain purposes, while a very much thicker mixture comparable to a varnish is desirable for other purposes as hereinafter specified.

The uses to which said article of manufacture has been applied are the employment of sheets of the same, produced as above described or by the molding of sheets, by means of the use of other materials as hereinafter set forth, and which sheets have been used as screens whereon pictures or other devices have been thrown by the use of stereopticon, moving picture or other projectors, or means for producing differentiated illumination so that the said pictures or light effects may appear brilliantly visible upon both sides of said screens simultaneously, or may be visible or shown more brilliantly upon the side toward such projecting device, or upon the side away from said projecting device, as may be desired.

In accomplishing such results, brilliancy of image upon the side of the screen toward the projecting device is increased as the amount or proportion of said pigment is increased with respect to the quantity of vehicle employed, and also as the proportion of heavy oil which tends to dry with a smooth or lustrous surface is decreased, or wholly omitted, and the proportion of turpentine or light oil which tends to dry with a dead or dull surface is increased, and conversely the brilliancy of the image upon the side of the screen away from the projecting means is heightened by a reduction of the amount of pigment and of turpentine or other light oil, together with an increase of the proportionate amount of linseed or other heavy drying oil, or the exclusive use of the latter.

By such means and in manner well known to the art, any desired proportion of luminosity may be secured upon either side of the screen or the same may be equally divided between the two sides of the screen. Analogous use may be made of other vehicles when employed.

Gums or varnishes may be added to the mixture as a means for increasing the thickness of the finished product, heightening surface luster and increasing the brilliancy of the image upon the side of the screen away from the projector.

It is also possible as desired, to give any tint or color to the screen and accordingly to show images upon it, through the employment of stains or colors of such nature that they will not impede the ready transmission of light.

Also, combinations of gelatine and of shellac have been employed and found available for use as above, either with or without the addition of glycerine as a softener and by means whereof, it is possible through use of a heated mixture to produce screens as above described, or if desired, to produce screens through the casting of plates upon smooth surfaces from which the same may be removed after cooling or drying, either independently or preferably cast or molded in conjunction with a cloth or supporting material, such as above described, always employing, however, magnesia or its equivalent.

It is evident that the invention may be employed in ways analogous to those above particularly set forth without in any wise departing from the principle and means herein described, and that screens may be produced of any desired or required thickness or size or with any desired or required proportion of luminosity as to the sides toward or away from the source of light.

Screens as above described are fully available in day-light or in the presence of any ordinary artificial light, for the reason that the magnesium carbonate above described, possesses the property of disseminating light with very great brilliancy and perfection, and that said powers of transmission and dissemination are made available either through the massing of the particles of said substance in close formation, in which case a very brilliant image is produced on the side of the screen toward the source of light, or in employing a smaller proportion of said pigment, in which case the image may be equally brilliant upon both sides of the screen, or in employing yet smaller proportion of the pigment, in which case the image may be barely visible on the side of the screen toward the light, while showing great brilliance on the side of the screen away from the light, such effects being made to vary at will as above set forth through modifications in the proportions of the materials, as above described.

Such modifications of effect are obtained with equal facility when gelatine or shellac or the like is used or any other available gums, rosins or similar translucent substances are employed. Such materials when free from impurities are well known to be transparent, when in physical condition they are massive and with plain surfaces, and to be or become translucent when they are broken up or their surfaces roughened artificially, but neither of said means is employed or claimed.

The results achieved in the transmission of light through such screens are obtained by reason of the varying refractive co-efficients of the pigment and the vehicle employed respectively and by means of reflecting surfaces or facets. This difference of refraction, however, and such reflection are not sufficient in practice as herein described to produce entire opaqueness or impenetrability to light, as is the case with ordinary paints usually employed in the arts, while on the other hand, the rays of light do not penetrate through the material of the screen to receive no diffusion or only such diffusion as may be occasioned by the refractive outer surfaces of the screen, but on the contrary are broken up and refracted and reflected in all directions by the numberless particles of pigment so held in the structure, and the solidified vehicle in contact with them, so that an effect of complete luminosity from every angle of vision is produced at all illuminated points of the screen, and a complete reproduction of light and shadow as contained in the projected picture may be seen from every angle of vision.

It is apparent that varying degrees of fineness of material may be employed and for convenience the two grades of heavy and light magnesia as ordinarily found in commerce may be used for convenience, employing either of the same by itself or combining the two, as slightly variant results may be obtained, to secure the particular effects desired. Should a completely opaque screen be desired a massing of the particles of magnesia secured by a great increase of the quantity employed and thickening of the screen will produce such result.

It is to be noted that with the use of magnesia powdered most finely and incorporated with an excess of vehicle, the separate grains tend to become practically invisible even under the microscope and that the mixture takes on the appearance of a colloid with the semblance of facets alone showing the presence of materials having varying refractive power. By means of a choice of vehicles and of magnesia ground to varying degrees of fineness and through varying the time between mixing and application, whatever optical results may be desired are readily secured.

It is to be noted that translucent materials such as precipitated marl, cleaned and separated from impurities and consisting of minute translucent globules, or the like, may be used either alone or in conjunction with magnesium carbonate for the purposes of securing somewhat varying effects in light transmission.

Finely powdered clear glass and translucent white sand have been employed, in the bodies of screens, in each case obtaining exceedingly brilliant effects under the influence of projected light.

It is well known that substances which are transparent in massive state, become translucent when subjected to internal fractures and that said substances when in pulverized form are translucent in greater or less degree.

No surface refraction is described or claimed, such as may be obtained by sprinkling a powdered translucent material upon an adhesive surface.

Having now described my invention, what is claimed to be secured by Letters Patent is:

1. As an article of manufacture a sheet or film comprising magnesium carbonate in finely divided form and oil.

2. As an article of manufacture a screen comprising magnesium carbonate and oil, spread upon a support and hardened.

3. As an article of manufacture, a screen composed of magnesium carbonate in a finely subdivided form and a translucent vehicle hardened into a sheet.

4. An intimate mixture of magnesium carbonate and oil in the form of a flexible sheet.

5. In the manufacture of a translucent screen, the process of intimately mixing a transparent vehicle with a pigment composed of particles of transparent material having an angle of refraction variant from that of the vehicle, spreading the same in a film or sheet and thereafter hardening the mass into a flexible and non-adhesive sheet.

6. In the manufacture of a translucent screen, the process of intimately mixing a transparent vehicle with a translucent pigment composed of particles of transparent material, having an angle of refraction variant from that of the vehicle, spreading the same on a cloth or fabric in a film or sheet and thereafter hardening the same into a flexible and non-adhesive sheet.

7. An intimate mixture of a comminuted transparent substance possessing a fixed co-efficient of refraction and a transparent vehicle possessing a fixed co-efficient of refraction differing therefrom hardened into a sheet.

8. An intimate mixture of a comminuted translucent substance possessing a fixed co-efficient of refraction and a translucent vehicle possessing a fixed co-efficient of refraction differing therefrom hardened into a sheet.

9. An intimate mixture of a comminuted transparent substance possessing co-efficients of refractions and a transparent vehicle possessing a fixed co-efficient of refraction differing therefrom hardened into a sheet.

10. In a rear projection screen of the type comprising an oiled fabric through which the projectng light beam passes on its way to the audience area, an intimate mixture of a comminuted translucent substance possessing a fixed co-efficient of refraction and a translucent vehicle possessing a fixed co-efficient of refraction differing therefrom hardened into a sheet, said translucent vehicle being an oil whereby there is produced an oiled fabric as specified, and said fabric and said comminuted translucent substance cooperating to produce a translucent screen properly light-diffusive for rear projection practice.

11. In a rear projection screen of the type comprising an oiled fabric through which the projecting light beam passes on its way to the audience area, an intimate mixture of a comminuted translucent substance possessing a fixed co-efficient of refraction and a translucent vehicle possessing a fixed co-efficient of refraction differing therefrom hardened into a sheet, said translucent vehicle comprising an oxidizing oil and a dryer whereby there is produced an oiled fabric which is flexible and non-adhesive, and said fabric and said comminuted translucent substance cooperating to produce a translucent screen properly light-diffusive for rear projection practice.

ULMONT O. CUMMING,
*Assignee of Waldo G. Morse, deceased.*